United States Patent
Kimura et al.

(10) Patent No.: US 6,843,671 B2
(45) Date of Patent: Jan. 18, 2005

(54) CONNECTOR WHICH IS RESISTANT AGAINST MECHANICAL SHOCK UPON CONNECTION

(75) Inventors: Akira Kimura, Kokubunji (JP); Masafumi Kodera, Akishima (JP); Takehiko Tsuruyama, Noda (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/342,760

(22) Filed: Jan. 15, 2003

(65) Prior Publication Data

US 2003/0134532 A1 Jul. 17, 2003

(30) Foreign Application Priority Data

Jan. 16, 2002 (JP) ......................................... 2002-007172

(51) Int. Cl.[7] .............................................. H01R 13/62
(52) U.S. Cl. ....................... 439/159; 439/108; 439/566; 439/876
(58) Field of Search ................................. 439/108, 159, 439/566, 570, 571, 572, 83, 607, 608, 876, 947

(56) References Cited

U.S. PATENT DOCUMENTS

| 4,568,133 A | * | 2/1986 | Amano et al. ............... 439/607 |
| 5,727,970 A | * | 3/1998 | Koguchi et al. ............ 439/607 |
| 6,042,411 A | * | 3/2000 | Choy .......................... 439/328 |
| 6,461,173 B1 | | 10/2002 | Mizuno et al. |

FOREIGN PATENT DOCUMENTS

| JP | 59-130388 | | 9/1984 |
| JP | 3029985 | * | 4/2000 |
| JP | 2000-323209 | | 11/2000 |
| JP | 2001-035609 | | 2/2001 |

* cited by examiner

Primary Examiner—Gary Paumen
Assistant Examiner—James R. Harvey
(74) Attorney, Agent, or Firm—Collard & Roe, P.C.

(57) ABSTRACT

In a connector adapted to be connected to and disconnected from a connection object, a fixing member is provided for fixing an insulator holding a contact to a fixation object. The fixing member has a butting portion to be brought into contact with a connection object when the connection object is connected to the connector. The fixing member may be a hold-down or an anchor pin.

9 Claims, 5 Drawing Sheets

CONNECTOR WHICH IS RESISTANT AGAINST MECHANICAL SHOCK UPON CONNECTION

This application claims priority to prior application JP 2002-7172, the disclosure of which is incorporated herein by reference.

BACKGROUND OF THE INVENTION

This invention relates to a connector to be connected to a connection object and, in particular, to a connector adapted to be connected to and disconnected from a connection object of a thin flat shape, such as an IC card, a memory card, and a PC card.

For example, Japanese Unexamined Patent Publication No. 2000-323209 (JP 2000-323209 A) discloses a connector of the type. The connector serves to connect a card, such as a PC card, and comprises a conductive pin contact, an insulator holding the pin contact, and a fixing member for fixing the insulator to a printed wiring board as a fixation object to which the insulator is to be fixed. The card is positioned substantially in parallel to the printed board and connected to the connector with being moved along the printed board. When the card is connected, an end portion of the card is brought into contact with the connector. Signal transmission between the card and the printed board is carried out through the pin contact.

When the card is moved in parallel to the printed board and connected to the connector, it is assumed that the end portion of the card collides with the insulator. If a large impact force is applied to the insulator upon collision, a rotation moment generated thereupon will overwhelms a fixing force by the fixing member. In this event, the connector can not withstand the rotation moment and may be inclined or fall down. In addition, the connector may be broken at the fixing member or therearound.

SUMMARY OF THE INVENTION

It is therefore an object of the present invention to provide a connector which is resistant against a mechanical shock upon connection.

It is another object of the present invention to provide a connector which is capable of reducing a rotation moment generated by a mechanical shock upon connection by the use of a fixing member for fixing the connector to a printed board as a fixation object to which the connector is to be fixed.

Other object of the present invention will become clear as the description proceeds.

According to an aspect of the present invention, there is provided a connector adapted to be connected to and disconnected from a connection object in a predetermined direction. The connector comprises a conductive contact, an insulator holding the contact, and a fixing member held by the insulator for fixing the insulator to a fixation object to which the connector is to be fixed. The fixing member comprises a butting portion to be brought into contact with the connection object when the connector and the connection object are connected to each other.

DESCRIPTION OF THE PREFERRED EMBODIMENTS

Figure 1:
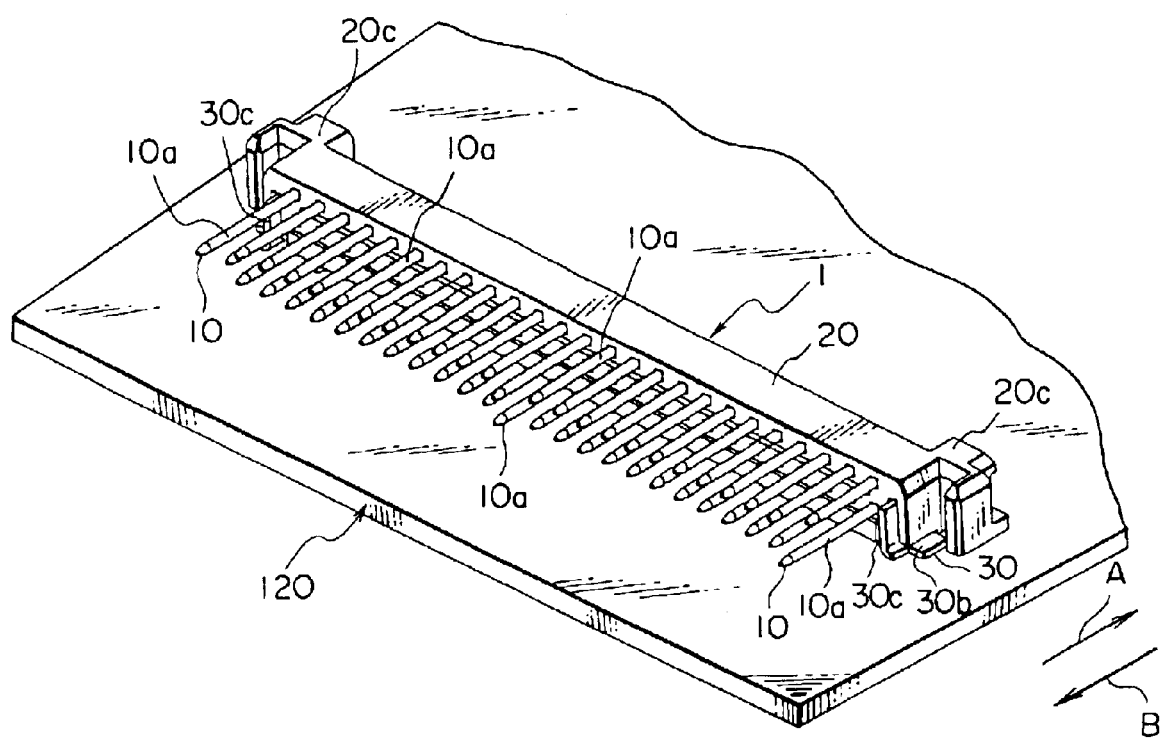
FIG. 1 is a perspective view of a connector according to a first embodiment of the present invention together with a board.
Figure 2:
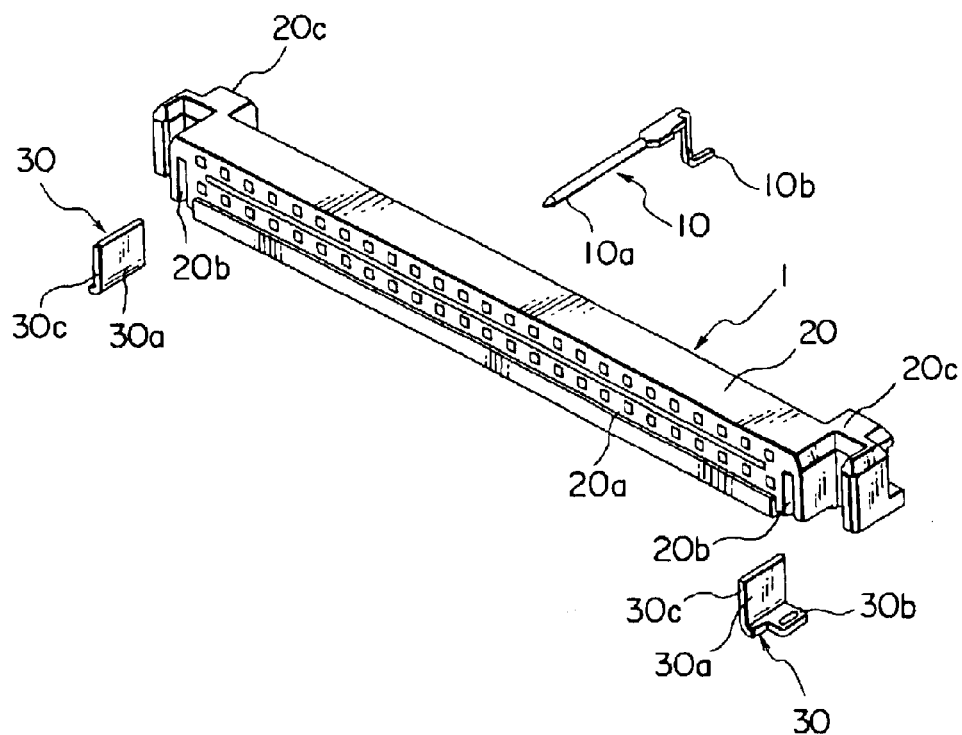
FIG. 2 is an exploded perspective view of the connector illustrated in FIG. 1.

Referring to FIGS. 1 and 2, description will be made of a connector according to a first embodiment of the present invention.

The connector is depicted by a reference numeral 1 and is adapted to be connected to a connection object of a thin flat shape, such as an IC card and a memory card. In the following description, the connection object will be referred to as a mating connector 100, shown in FIGS. 3 and 4. When the mating connector is connected to or disconnected from the connector 1, the mating connector is moved in a predetermined direction, i.e., a connecting direction A or a disconnecting direction B opposite to the connecting direction A.

The connector 1 comprises a plurality of conductive contacts 10 and an elongated insulator 20 made of resin and holding the contacts 10 arranged in arrays, and a pair of hold-downs 30 as a fixing member for fixing the insulator 20 to a printed board 120 as a fixation object. The insulator 20 has a confronting surface 20a oriented in the disconnecting direction B to face the mating connector when the connector 1 is connected to the mating connector. Each of the contacts 10 has a pin-shaped contacting portion 10a protruding from the confronting surface 20a of the insulator 20.

The hold-downs 30 are attached to longitudinal opposite ends of the insulator 20. Each hold-down 30 has a flat press-fit portion 30a and a fixing portion 30b integral therewith and bent from the press-fit portion 30a to be substantially orthogonal thereto. Each hold-down 30 is desirably made of a material greater in mechanical strength than the insulator 20, for example, a metal plate material.

The insulator 20 has a pair of block portions 20c formed at the longitudinal opposite ends thereof and a pair of grooves 20b formed in the vicinity of the block portions 20c, respectively. Each of the grooves 20b extends upward from a bottom surface of the insulator 20 and is opened on the confronting surface 20a of the insulator 20.

The press-fit portion 30a of each hold-down 30 is press-fitted into the groove 20b of the insulator 20 to be fixed thereto. On the other hand, the fixing portion 30b is brought into contact with the printed board 120 and fixed to the printed board 120, for example, by soldering. As a result, the connector 1 is fixed to the printed board 120 by the hold-downs 30. Each contact 10 has a terminal portion 10b connected to a conductive pattern (not shown) formed on the printed board 120, for example, by soldering.

Each hold-down 30 further has a butting portion 30c integral with the press-fit portion 30a and protruding from the confronting surface 20a of the insulator 20. The butting portion 30c has a butting surface to be brought into contact with an end face of the mating connector in the connecting direction A when the mating connector is moved in the connecting direction A to be connected to the connector 1. The height of the butting surface from the printed board 120 is designed to be smaller than the height of the insulator 20.

When the mating connector is connected to the connector 1, the mating connector is brought into contact not with the insulator 20 but with the confronting surfaces of the hold-downs 30. Therefore, a rotation moment generated by a mechanical shock upon connection is reduced.

Figure 3:
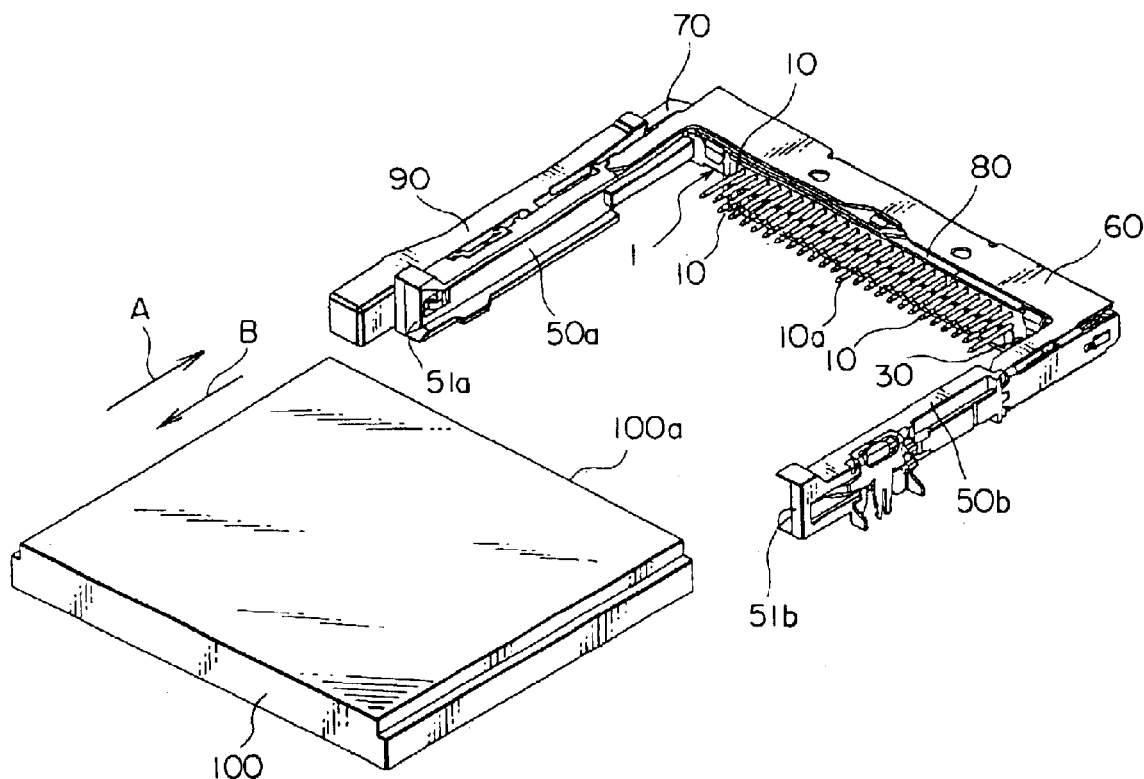
FIG. 3 is a perspective view of a card connector comprising the connector illustrated in FIG. 1 in the state where a card is not connected.
Figure 4:
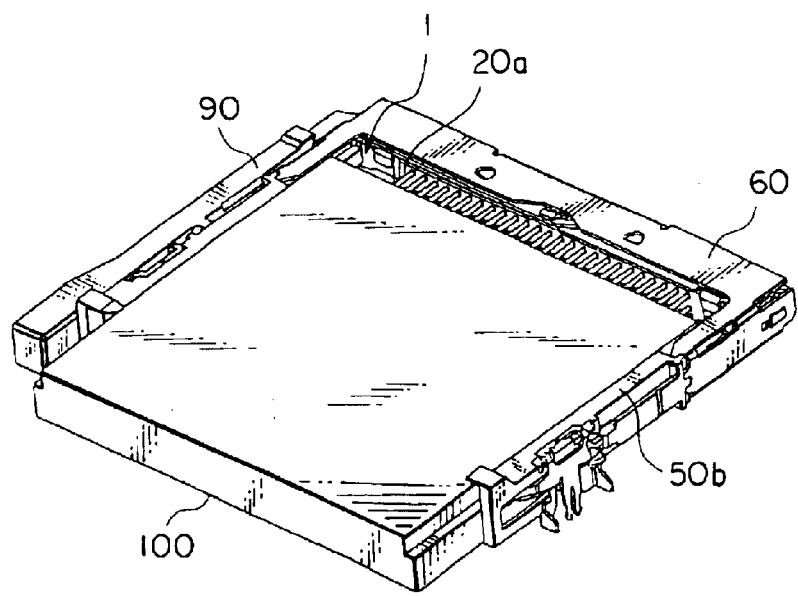
FIG. 4 is a perspective view of the card connector illustrated in FIG. 3 in the state where the card is connected.

Referring to FIGS. 3 and 4 in addition to FIGS. 1 and 2, description will be made of a card connector comprising the connector 1 illustrated in FIGS. 1 and 2.

The card connector comprises a pair of frames 50a and 50b coupled to the connector 1. The frames 50a and 50b have one ends connected to the block portions 20b of the insulator 20 and extend in the connecting and the disconnecting directions A and B to face each other. The frames 50a and 50b have guide portions 51a and 51b, respectively, for slidably holding a pair of edge portions of the mating connector 100 which extend in parallel to the connecting and the disconnecting directions A and B. Thus, the mating connector 100 is guided by the frames 50a and 50b to move in the connecting and the disconnecting directions A and B.

The card connector further has a cover 60 covering the insulator 20 and a part of each of the frames 50a and 50b, and a disconnecting mechanism (not shown) for disconnecting the mating connector 100. The cover 60 is disposed on upper surfaces of the insulator 20 and the frames 50a and 50b in a bridged state.

The disconnecting mechanism has an eject button 90 arranged along an outer side surface of one frame 50a and manually operable, and a plate 80 for moving the mating connector 100 in the disconnecting direction B in cooperation with the eject button 90.

When the mating connector 100 is connected to the connector 1, the mating connector 100 is brought into contact not with the insulator 20 but with the butting surfaces of the hold-downs 30. Therefore, a rotation moment generated by a mechanical shock upon connection is reduced.

Figure 5:
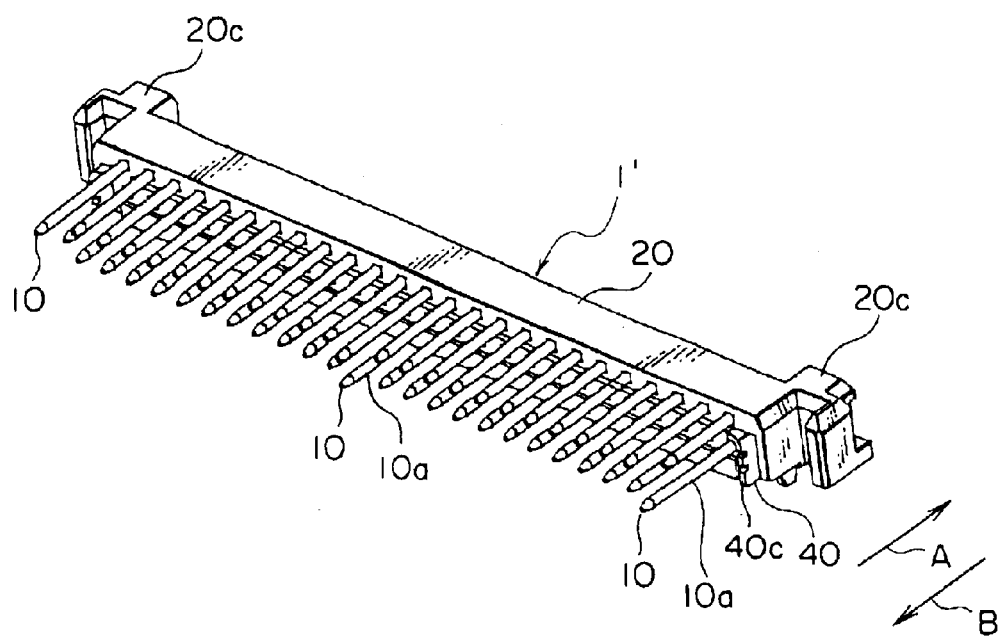
FIG. 5 is a perspective view of a connector according to a second embodiment of the present invention.
Figure 6:
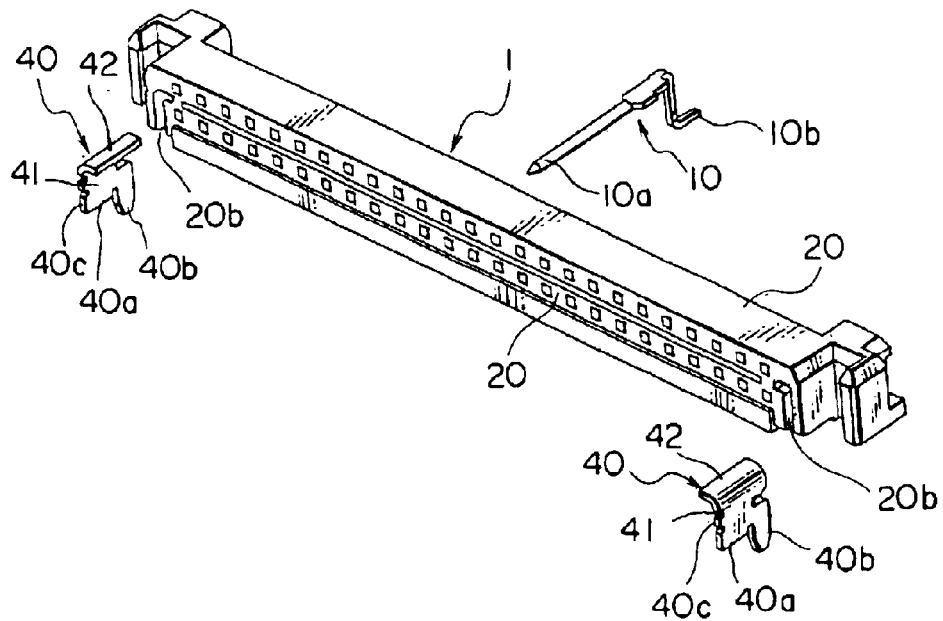
FIG. 6 is an exploded perspective view of the connector illustrated in FIG. 5.

Referring to FIGS. 5 and 6, description will be made of a connector according to a second embodiment of the present invention. Similar parts are designated by like reference numerals and will not be described.

In the connector 1' illustrated in FIGS. 5 and 6, the hold-downs 30 of the connector 1 illustrated in FIGS. 1 and 2 are replaced by anchor pins 40. Each of the anchor pins 40 is desirably made of a material greater in mechanical strength than the insulator 20, for example, a metal plate material.

Each of the anchor pins 40 has a flat press-fit portion 40a and a fixing portion 40b integral with the press-fit portion 40a. The fixing portion 40b is inserted into a through hole of the printed board with the connector 1' mounted thereon and fixed to the printed board, for example, by soldering. The press-fit portion 40a has a first part 41 coplanar with the fixing portion 40b and a second part 42 bent from the first part 41. The groove 20b of the insulator 20 has a shape adapted to that of the pres-fit portion 40a. Thus, the press-fit portion 40a of each anchor pin 40 is press-fitted into the groove 20b of the insulator 20 to be fixed thereto.

Each of the anchor pins 40 further has a butting portion 40c integral with the press-fit portion 40a and protruding from the confronting surface 20a of the insulator 20. The butting portion 40c has a butting surface to be brought into contact with the end face of the mating connector in the connecting direction A when the mating connector 100 is moved in the connecting direction A to be connected to the connector 1'. The height of the butting surface from the printed board is designed to be smaller than the height of the insulator 20.

When the mating connector is connected to the connector 1', the mating connector is brought into contact not with the insulator 20 but with the butting surfaces of the anchor pins 40. Therefore, a rotation moment generated by a mechanical shock upon connection is reduced.

Figure 7:
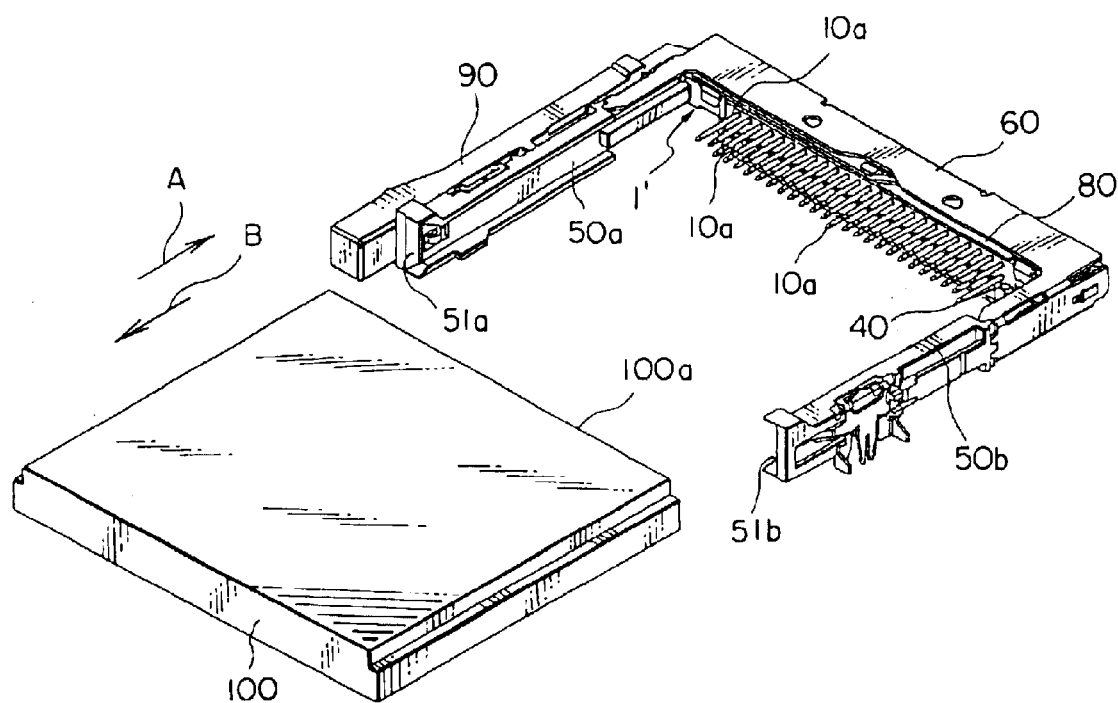
FIG. 7 is a perspective view of a card connector comprising the connector illustrated in FIG. 5 in the state where a card is not connected.
Figure 8:
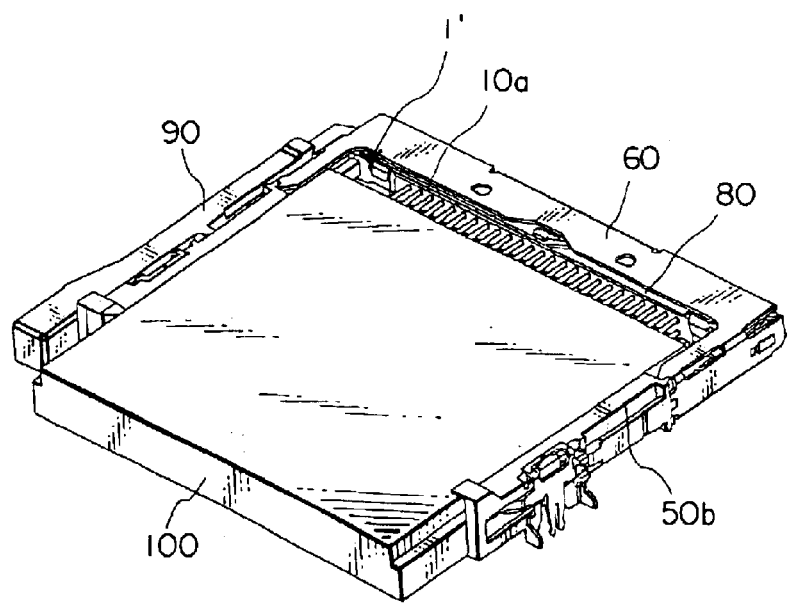
FIG. 8 is a perspective view of the card connector illustrated in FIG. 7 in the state where the card is connected.

The connector 1' illustrated in FIGS. 5 and 6 can be used for a card connector, like the connector 1 illustrated in FIGS. 1 and 2. The card connector comprising the connector 1' is illustrated in FIGS. 7 and 8. Similar parts are designated by like reference numerals and will not be described.

Figure 9:
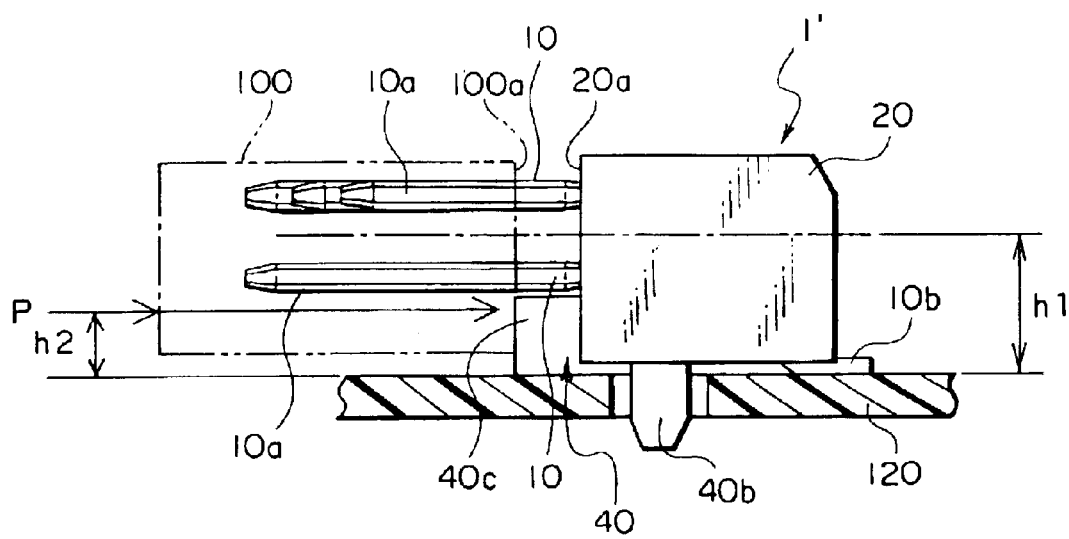
FIG. 9 is a view for describing a rotation moment generated when the card is connected to the card connector illustrated in FIG. 8.

Referring to FIG. 9 in addition to FIGS. 7 and 8, description will be made of the rotation moment generated by the mechanical shock upon connection.

Whenever the connector 1' is connected to the mating connector 100, an impact force P is applied to the connector 1'. Assuming here that each anchor pin 40 does not have the butting portion 40c, it is deemed that the impact force P is applied to a particular portion between upper and lower contacts 10 of the connector 1'. In this event, a first rotation moment Ma is produced to act the connector 1'. Therefore, the first rotation moment Ma will be given by:

$$Ma = P \times h1,$$

Where h1 is a first distance between the printed board 120 and the particular portion.

In case where each anchor pin 40 has the butting portion 40c as illustrated in FIG. 9, the end face 100a of the mating connector 100 is brought into contact with the butting surfaces of the anchor pins 40 when the mating connector 100 is connected to the connector 1'. In this event, it is deemed that the impact force P is applied to a specific portion between the particular portion and the printed board 120 to produce a second rotation moment Mb acting the connector 1'. Therefore, the second rotation moment Mb will be given by:

$$Mb = P \times h2,$$

Where h2 is a second distance between the printed board 120 and the specific portion.

It will be noted that the first rotation moment Mb is smaller than the second rotation moment Ma. This is because the second distance is shorter than the first distance.

Thus, the rotation moment is reduced so that, even if the impact force is applied, the connector 1' is kept in a normal condition without being separated from the printed board 120 or without being bent. In addition, the mating connector 100 can easily be disconnected by the disconnecting mechanism. In case where the hold-downs are used instead of the anchor pins, the rotation moment is similar to that mentioned above.

In the foregoing description, the card connector is described. However, it will readily understood that this invention is also applicable to any known connector mounted to a board and adapted to be connected to and disconnected from a mating connector.

What is claimed is:

1. A connector adapted to be connected to a connection object in a predetermined direction and disconnected from the connection object in a direction opposite to the predetermined direction, said connector comprising:

a conductive contact;

an insulator holding said contact;

a fixing member held by said insulator for fixing said insulator to a fixation object to which said connector is to be fixed, said fixing member comprising a butting portion protruding from said insulator in a direction opposite to said predetermined direction, said butting portion having a butting surface to be brought into contact with said connection object in said predetermined direction when said connector and said connection object are connected to each other;

a pair of frames coupled to opposite ends of said insulator and extending in said predetermined direction to face each other, said frames having a guide portion for guiding said connection object in said predetermined direction; and a disconnecting mechanism for disconnecting said connection object, said disconnecting mechanism comprising an eject button formed on one of said frames and manually operable; and a plate for moving said connection object in a disconnecting direction in cooperation with said eject button.

2. The connector according to claim 1, wherein said insulator has a confronting surface to face said connection object in said predetermined direction when said connector and said connection object are connected to each other, said butting portion protruding from said confronting surface.

3. The connector according to claim 1, wherein said insulator has a groove, said fixing member further comprising:

a flat press-fit portion press-fitted into said groove; and a fixing portion integral with said press-fit portion and fixed to said fixation object, said butting portion extending from said press-fit portion in a direction opposite to said predetermined direction.

4. The connector according to claim 3, wherein said fixing portion extends along a surface of said fixation object.

5. The connector according to claim 4, wherein said press-fit portion extends to be substantially orthogonal to said fixing potion.

6. The connector according to claim 3, wherein said fixing portion extends through said fixation object.

7. The connector according to claim 6, wherein said press-fit portion has a first portion coplanar with said fixing portion and a second portion bent from said first portion.

8. The connector according to claim 1, wherein said insulator has a bottom surface facing said fixation object and an upper surface opposite to said bottom surface, said butting portion being spaced from said upper surface.

9. The connector according to claim 1, further comprising a cover which covers said insulator and said frames.

* * * * *